US010755167B2

(12) United States Patent
Pantazi et al.

(10) Patent No.: US 10,755,167 B2
(45) Date of Patent: Aug. 25, 2020

(54) NEUROMORPHIC ARCHITECTURE WITH MULTIPLE COUPLED NEURONS USING INTERNAL STATE NEURON INFORMATION

(71) Applicant: International Business Machines Corporation, Armonk, NY (US)

(72) Inventors: Angeliki Pantazi, Thalwil (CH); Tomas Tuma, Adliswil (CH); Stanislaw Wozniak, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 15/189,449

(22) Filed: Jun. 22, 2016

(65) Prior Publication Data

US 2017/0372194 A1    Dec. 28, 2017

(51) Int. Cl.
*G06N 3/063* (2006.01)
*G06N 3/04* (2006.01)

(52) U.S. Cl.
CPC .............. *G06N 3/063* (2013.01); *G06N 3/049* (2013.01)

(58) Field of Classification Search
CPC .......... G06N 3/04; G06N 3/049; G06N 3/063; Y04S 10/54
See application file for complete search history.

(56) References Cited

U.S. PATENT DOCUMENTS

| 8,990,133 | B1 | 3/2015 | Ponulak et al. |
| 9,146,546 | B2 | 9/2015 | Sinyavskiy et al. |
| 9,208,432 | B2 | 12/2015 | Buibas et al. |
| 9,245,223 | B2 | 1/2016 | Modha |
| 2011/0137843 | A1* | 6/2011 | Poon ..................... G06N 3/049 706/33 |
| 2014/0129497 | A1* | 5/2014 | Campos ................. G06N 3/049 706/22 |
| 2017/0236051 | A1* | 8/2017 | van der Made ....... G06N 3/049 706/27 |

OTHER PUBLICATIONS

Bichler et al., "Extraction of temporally correlated features from dynamic vision sensors with spike-timing-dependent plasticity", Aug. 2012, Neural Networks, vol. 2, pp. 339-348 (Year: 2012).*
Afshar et al., "Racing to learn: statistical inference and learning in a single spiking neuron with adaptive kernels", Nov. 25, 2014, frontiers in Neuroscience, p. 1-18 (Year: 2014).*

(Continued)

*Primary Examiner* — Robert A Cassity
*Assistant Examiner* — Brent Johnston Hoover
(74) *Attorney, Agent, or Firm* — Scully, Scott, Murphy & Presser, P.C.; Daniel Morris, Esq.

(57) ABSTRACT

This invention relates to an apparatus, system, and method for computing with neuromorphic circuit architectures that have neurons with interconnected internal state information. The interconnected internal state information allows the neurons to enable or strengthen the input to other neurons. Furthermore, neuron internal state information provides insights on the characteristics of the input data that can be used to enhance the performance of the neuromorphic system. The neuromorphic system can be implemented with an artificial phase-change-based neurons.

20 Claims, 10 Drawing Sheets

(56) References Cited

OTHER PUBLICATIONS

Bichler et al., "Visual Pattern Extraction Using Energy-Efficient "2-PCM Synapse" Neuromorphic Architecture", Aug. 2012, IEEE Transactions on Electron Devices, vol. 59, No. 8, pp. 2206-2214 (Year: 2012).*

Chu et al., "Neuromorphic Hardware System for Visual Pattern Recognition With Memristor Array and CMOS Neuron", Apr. 2015, IEEE Transactions on Industrial Electronics, vol. 62, No. 4, pp. 2410-2419 (Year: 2015).*

Serrano-Gotarredona et al., "STDP and STDP variations with memristors for spiking neuromorphic learning systems", Frontiers in Neuroscience, Feb. 2013, vol. 7, Article 2, pp. 1-15.

Deco et al., "The Dynamic Brain: From Spiking Neurons to Neural Masses and Cortical Fields", PLoS Computational Biology, Aug. 2008, vol. 4, Issue 8, pp. 1-35.

* cited by examiner

NEUROMORPHIC ARCHITECTURE WITH MULTIPLE COUPLED NEURONS USING INTERNAL STATE NEURON INFORMATION

FIELD OF TECHNOLOGY

The present disclosure relates to the technical field of circuit architectures. More particularly, the present disclosure is in the field of neuromorphic computing using coupled neuron elements.

BACKGROUND OF THE INVENTION

In conventional computers, complementary metal-oxide-semiconductor (CMOS) transistor technology and Von Neumann architectures are used to implement the computing elements. However, these computers, as commonly implemented, can have disadvantages. Notably, the power requirements are often higher for these systems. For some Big Data applications, the conventional computing paradigm can require over an order of magnitude greater power usage versus competing paradigms, such as neuromorphic systems.

In biological systems, the point of contact between an axon of a neuron and a dendrite of a second neuron is referred to as a synapse. It is widely viewed that the synapse plays an essential role in the formation of memory. As a neurotransmitter activates a receptor across a synaptic cleft, the connection between the two neurons is strengthened when both neurons are active at the same time, as a result of the receptor's signaling mechanisms. The strength of two connected neural pathways is thought to result in the storage of information, resulting in memory. This process of synaptic strengthening is known as long-term potentiation. That is, the synaptic conductance changes with time as a function of the relative spike times of pre-synaptic and post-synaptic neurons, as per spike-timing dependent plasticity (STDP). The spike-timing dependent plasticity increases the conductance of a synapse if its post-synaptic neuron fires after its pre-synaptic neuron fires, and decreases the conductance of a synapse if the order of the two firings is reversed.

Neuromorphic or artificial neural network systems are computational systems that function in a manner analogous to that of biological neural systems. Neuromorphic systems generally do not follow the traditional model of manipulating binary data. Instead, neuromorphic systems have connections between processing elements that attempt to mirror the neurons of a biological neural system. As such, neuromorphic systems may include various electronic circuit elements that are modeled on neurons.

Neuromorphic computers may allow machines the ability to perform complex functions by mimicking the brain. The natural ability of the brain to perform a high number of complex functions in parallel that have significantly better capabilities than many computers along several metrics. These future neuromorphic processors may have a major impact of computing, particularly in terms of efficiency. Application areas, such as database manipulation and searches, image processing for radar application, simultaneous localization and mapping, and medical imaging processing, can see substantial benefits from the technology. As data sets become larger, there is a need for a fundamental change in how computers are architected. Neuromorphic architectures can scale to these data sets, while providing better performance in terms of size and power requirements.

Previous neuromorphic computing implementations have demonstrated the feasibility of mimicking brain functionality. However, current implementations of neuromorphic computing elements have shortcomings in their overall effectiveness. Some previous neuromorphic circuits have focused on using inhibitory links. These architectures may use the output of a neuron to disable other neurons. For example, each neuron may inhibit the integration of all the other neurons during a time interval after a spike. In such a winner-take-all configuration, only the neuron with the highest activation stays active while all other neurons shut down. However, these configurations can have poor performance in learning multiple correlations compared to other configurations. Also, these configurations have limited reliability and insight on the features of the input data. There still remains the potential for substantial improvement through novel circuit architectures.

SUMMARY

In one aspect, the disclosure relates to a neuromorphic architecture comprising a single or multilayer layer network in which neurons within a layer are interconnected with internal state information links. Primarily, neurons in the same layer are connected with the internal state information links, but the internal state information of a neuron can also be transmitted to neurons in different layers of a multilayer network. The internal state information of the neuron is used to modify the operation of other neurons. For example, the interconnecting of neurons using internal state information can enable or strengthen the input signal to other neurons. The neuron internal state information provides insight into the characteristics of the input data that can be used to enhance the performance or increase the capabilities of the neuromorphic system.

The disclosure further relates to electronic neuron elements. These neuron elements are basic processing circuit elements that can be linked and generally behave as temporal integrators with some degree of leakage. Their internal potential reflects the sum of the various positive or negative inputs received over time, subjected to a leakage that can be, as an example, modeled by a constant leakage current. When the internal potential of the neuron passes a threshold, the neuron element outputs a signal, or fires, via a logic and/or electrical event of short duration, simulating the action potential of biological neurons. The neuron elements internal potential then returns to its inactivated output state. This logic event will in turn, through the intermediary of its electrical manifestation, generate an input in the post-synaptic neurons connected to the source neuron.

Embodiments further provide a neuromorphic circuit architecture. According to an embodiment, a neuromorphic circuit comprises a plurality of interconnected electronic neurons. Each circuit comprises an electronic synapse array comprising multiple synapses, each connecting to at least one electronic neuron, a synapse interconnecting an axon of a pre-synaptic neuron with a dendrite of a post-synaptic neuron, wherein a neuron integrates input spikes and generates a spike event in response to the integrated input spikes exceeding a threshold, as previously described. In embodiments, the present invention provides a neuromorphic circuit with a postsynaptic neuron with multiple synaptic time dependent plasticity synapses. An embodiment may include such a design with single or multilayer networks.

In another embodiment, the invention comprises a neuromorphic circuit implementing a spiking neural network with synaptic weights. The spiking neural network includes synapses at junctions of an interconnection network for interconnecting electronic neurons.

The invention further relates to neuromorphic methods for data processing, including, but not limited to receiving successive analogue pulses each having a certain value, accumulating the values of the pulses received, and emitting a pulse according to the accumulation value. The invention, in an embodiment, further relates to the fields of correlation detection circuits, classifying data, and recognizing patterns. Correlation detection is a key computational primitive cognitivein computing with many application areas. It can be a computationally intensive algorithm, especially when there are a large number of inputs.

In an embodiment, an apparatus for computation may comprise a first electronic neuron comprising a first internal state, and a second electronic neuron, wherein the first internal state is connected to an internal state input of the second electronic neuron, thereby modifying the operation of the second electronic neuron.

In an alternative embodiment, an apparatus for computation may comprise a first electronic neuron comprising a first internal state, a second electronic neuron, wherein the first internal state is connected to an internal state input of the second electronic neuron, thereby modifying the operation of the second electronic neuron, and a third electronic neuron, wherein the first internal state is connected to an internal state input of the third electronic neuron, thereby modifying the operation of the third electronic neuron.

In a further embodiment, a method for computation may comprise receiving a first set of inputs at a first spike-timing dependent plasticity synapse, receiving a second set of inputs at a second spike-timing dependent plasticity synapse, combining the output of the first spike-timing dependent plasticity synapse and the second spike-timing dependent plasticity synapse in a first neuron to generate a cumulative postsynaptic potential signal, receiving the cumulative postsynaptic potential signal at an input of a second neuron and modifying the operation of the second neuron based on the cumulative postsynaptic potential signal.

These and other features, aspects and advantages of the present invention will become understood with reference to the following description, appended claims and accompanying figures.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Embodiments described herein provide neuromorphic event-driven neural computing architectures in scalable neural networks. In embodiments a low-power event-driven neural computing architecture for a neural network comprising a low-power digital complementary metal-oxide-semiconductor (CMOS) spiking circuit implementing neural processes, such as spike-timing dependent plasticity is provided.

The term neuron (also referred to as an electronic neuron) as used herein represents a device configured to simulate a biological neuron. A neuron creates connections between processing elements that are roughly functionally equivalent to neurons of a biological brain. As such, a neuromorphic system comprising electronic neurons according to embodiments of the invention may include various electronic circuits that are modeled on biological neurons. Further, a neuromorphic system comprising electronic neurons according to embodiments of the invention may include various processing elements (including computer simulations) that are modeled on biological neurons. Although certain illustrative embodiments of the invention are described herein using electronic neurons comprising electronic circuits, such as CMOS transistors or memristors, the present invention is not limited to electronic circuits. A neuromorphic system according to embodiments of the invention can be implemented as a neuromorphic architecture comprising circuitry, and additionally as a computer simulation. Embodiments of the invention can take the form of an entirely hardware embodiment, an entirely software embodiment, or an embodiment containing both hardware and software elements.

The neuromorphic circuit may include a pre-synaptic neuron circuit, a pre-synaptic neuron circuit, and a synapse circuit connecting the pre-synaptic neuron circuit and the post-synaptic neuron circuit, wherein the synapse circuit is configured to output a sum of signals. In an embodiment, the synapse circuit is configured to output a sum of signals output from two memristors connected to the pre-synaptic neuron circuit, to the post-synaptic neuron circuit.

Another realization of single spiking neuron computational primitive can be constructed using phase-change devices that implement the core of the neuro-synaptic dynamics. The phase change devices can be used to implement an artificial phase-change-based neuron. The neuron can be of the integrate-and-fire type and its main element, the neuronal membrane, can be emulated with a phase-change cell. The membrane potential evolves according to the total postsynaptic potential (tPSP) generated by the neuronal input signals. The neuronal membrane potential is stored in the phase configuration within the device. Phase-change materials have two stable states with high resistivity contrast, namely, the crystalline (low resistivity) and the amorphous (high resistivity) state. The possibility of programming the cells in different intermediate amorphous/crystalline configurations using the crystal growth dynamics is exploited to emulate the neuronal membrane potential. The membrane potential is updated by electrical pulses whose amplitude and/or duration are based on the strength of the tPSP signal. Successive application of these crystallizing pulses progressively reduces the amorphous region and increases the cell conductance. This inherent accumulation feature of the phase-change materials provides the physical means for implementing a simplified form of an integrate-and-fire neuron. Neuron ring occurs once the cell conductance crosses a given threshold value. Subsequently, a high power pulse with an abrupt cut-off (reset pulse) re-creates the amorphous region through the melting and quenching process. The postsynaptic potentials are provided by the phase-change synapses used to weight the spike-based presynaptic signals. A feedback mechanism in the form of spike-timing dependent plasticity is responsible for tuning the synaptic weights, emulated by phase-change cells. This computational primitive constitutes a building block for large, dense and highly efficient single spiking neuron implementations.

Figure 1:
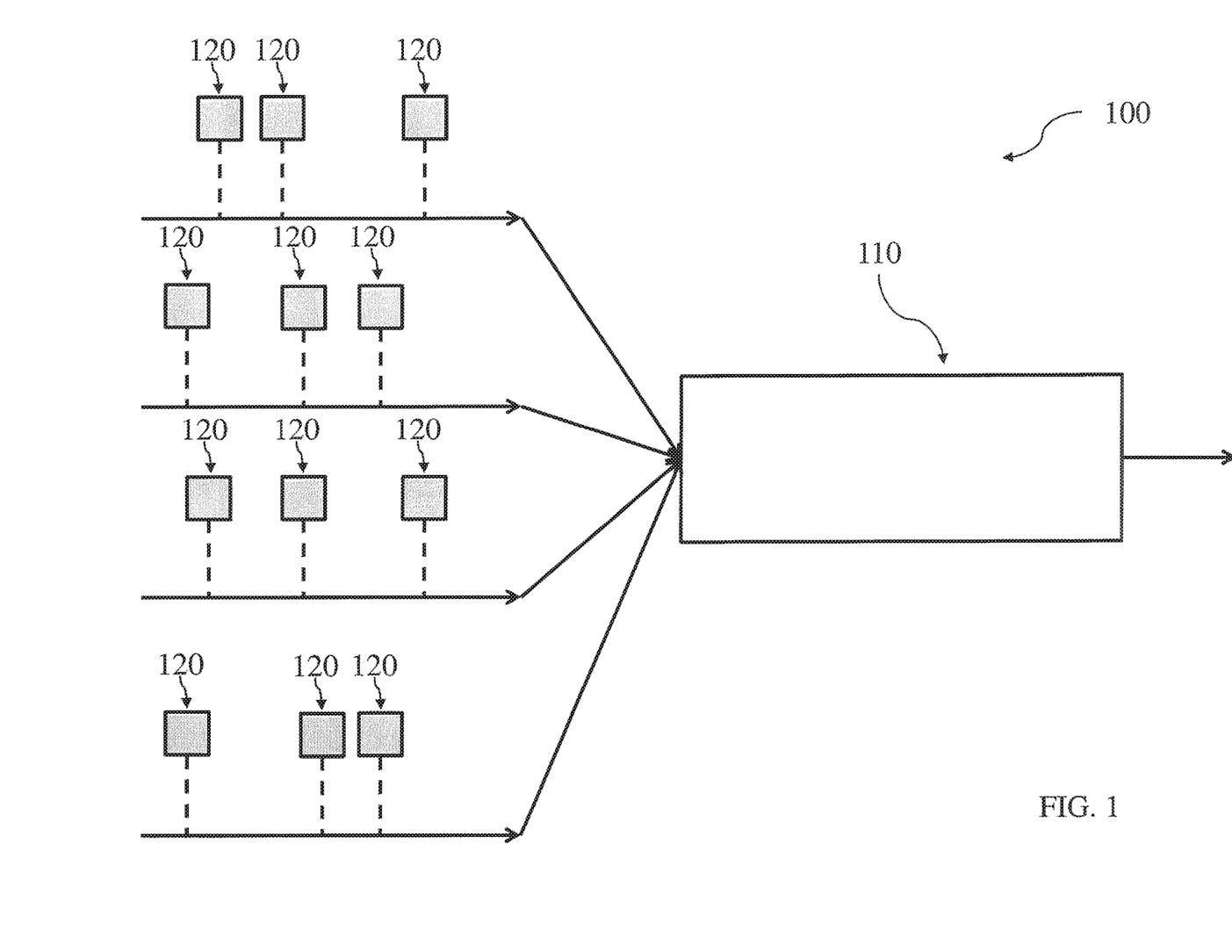
FIG. 1 illustrates a correlation detection circuit, according to an embodiment of the present invention.

FIG. 1 illustrates a correlation detection circuit 100 setup, according to an embodiment of the present invention. The correlation detector 110 is con connected to multiple input elements. At various times, input signals 120 arrive at the input to the correlation detector 110. If input signals 120 arrive at the same tune and have a similar form, the correlation detector 110 will output a signal indicating that the signals correlate. The output of the correlation detector can vary based on the degree of correlation among the input signals 120. The correlation detector 110 can be implemented using neuromorphic elements, and may include memristors. Such an implementation may have performance advantages over other circuit architectures.

Figure 2:
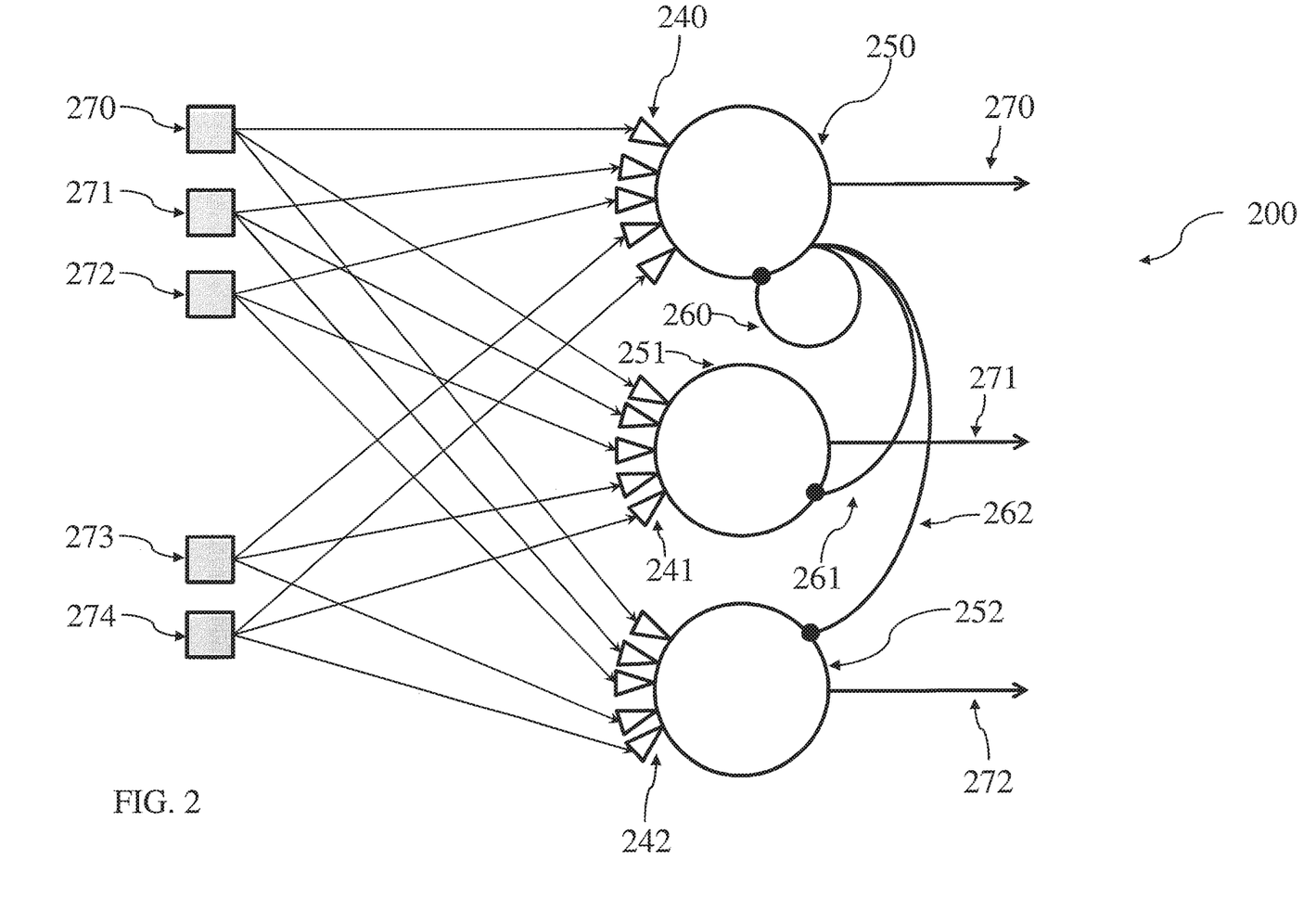
FIG. 2 illustrates a neuromorphic architecture with multiple coupled neurons using internal state neuron information, according to an embodiment the invention.

FIG. 2 illustrates a neuromorphic architecture with multiple coupled neurons using internal state neuron information, according to an embodiment of the invention. The neuromorphic circuit 200 has a single layer network in this embodiment. The neurons 250, 251, 252 in the same layer are interconnected with internal state information links 260, 261, 262. A first neuron 250 connects with itself through a first internal state information link 260. A second neuron 251 connects to the first neuron using a second internal state information link 261. A third neuron 252 connects to the first neuron 250 using a third internal state information link 262. The input data sources 270, 271, 272, 273, 274 are connected to the set of synapses 240, 241, 242 that are connected to the neurons 250, 251, 252. For example the first input data source 270 connects to a synapse of the first set of synapses 240. Based on the signals at the input data sources 270-274, the first neuron 250 may generate a signal on the first internal state information link 260, the second internal state information link 261, and/or the third internal state information link 262. Any of the internal state information links can be used to change the operation of the neurons to which it connects. For example, the second internal state information link 261 may be used to enable the second neuron 251 if the signal level passes a threshold value.

Figure 3:
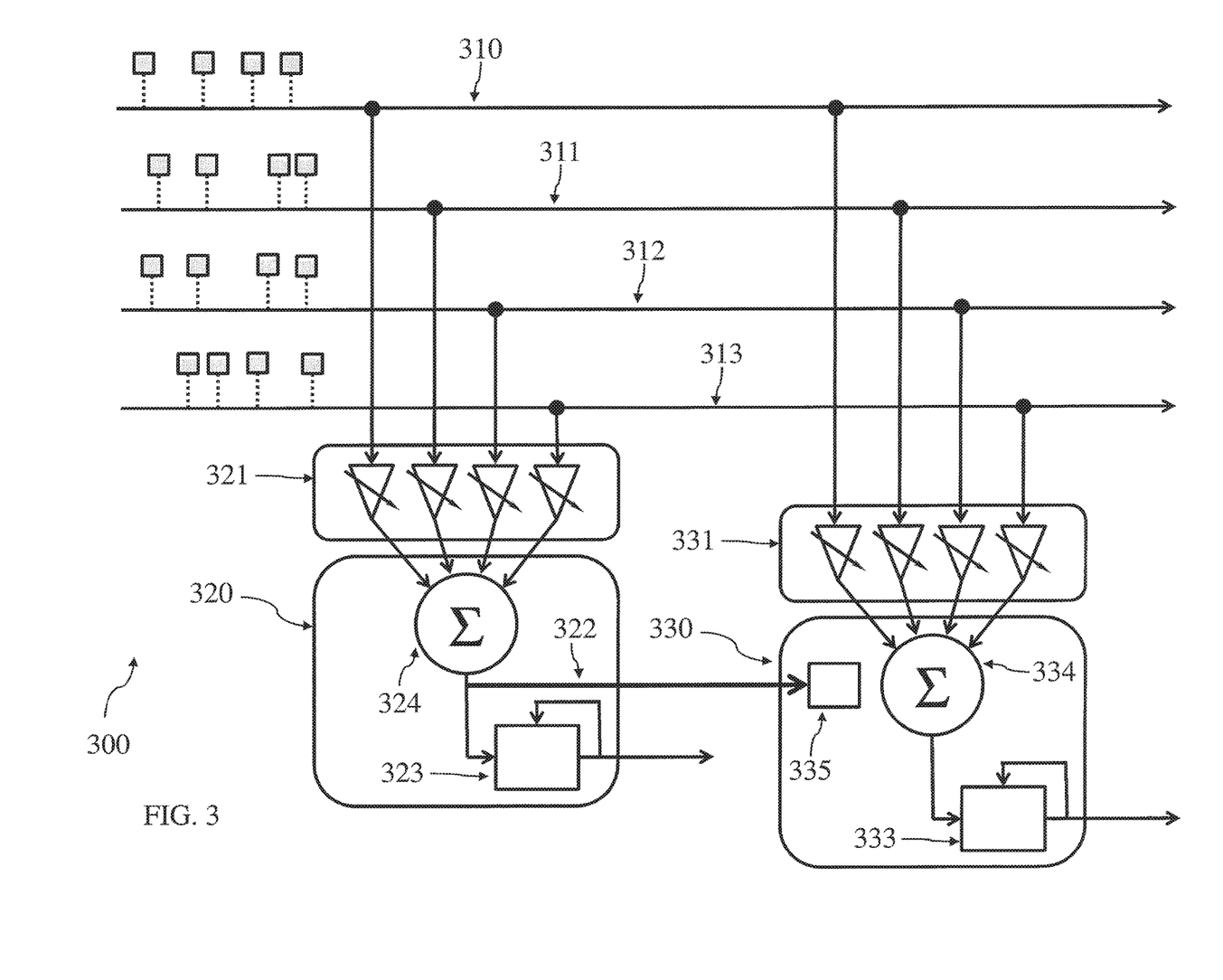
FIG. 3 illustrates a neuromorphic circuit with two coupled neurons using internal state neuron information, according to an embodiment of the invention.

FIG. 3 illustrates a neuromorphic circuit 300 with two coupled neurons using internal state neuron information, according to an embodiment of the invention. In this circuit, there are four input signal lines 310, 311, 312, 313, with each input signal line feeding into the first set of synapses 321 and the second set of synapses 331. The output of the first set of synapses 321 connects to the first neuron 320. Likewise, the output of the second set of synapses 331 connects to the second neuron 330. The first neuron contains a summing element 324 that combines the output of the first set of synapses 321. The second neuron also contains a summing element 334. The output of the summing element is the cumulative postsynaptic potential signal 322 (CPSP). The cumulative postsynaptic potential signal 322 is then fed into the integrate and fire element 323. The cumulative postsynaptic potential signal 322 also connects to the second neuron 330, where it is an input to an enable element 335. The enable element 335 causes the second neuron to only become active if the cumulative postsynaptic potential signal 322 is above a threshold value. Thus, the input and output of the integrate and fire element 333 of the second neuron will be disabled unless the cumulative postsynaptic potential signal 322 is above that threshold.

In this circuit, the cumulative postsynaptic potential signal 322 is the internal information link between the two neurons. In different embodiments, other internal information links may be used. For example, a cumulative postsynaptic potential computed from fraction of inputs, spike timing information, or neuronal membrane signals may be used.

The enable element 335 can be replaced by different thresholds in alternative embodiments. The enable element can set the activation threshold to a particular range of values. That is, the neuron can be level-tuned to an input signal level. This level-tuning increases the ability of the neuron, and in turn, the neural network, to discriminate input information.

Figure 4:
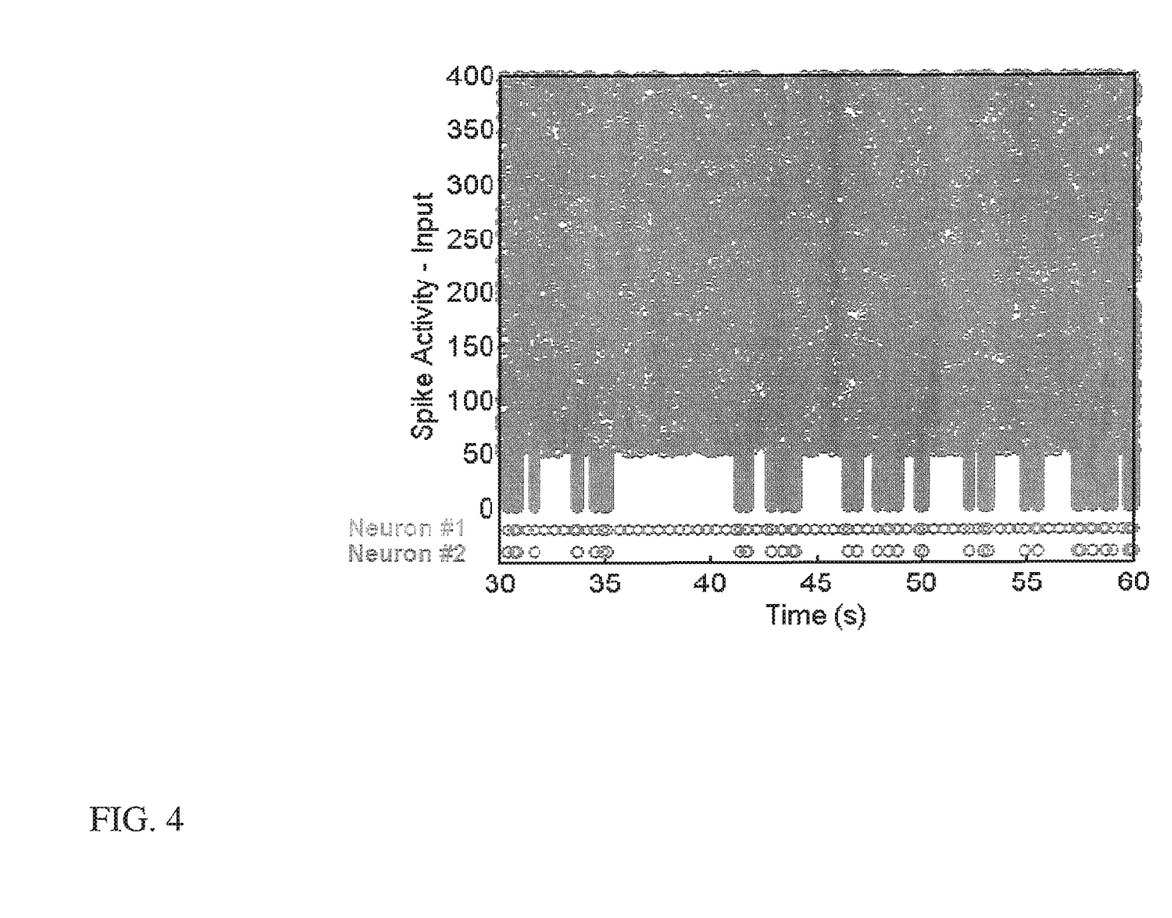
FIG. 4 shows a plot of the outputs of a neuromorphic circuit with two coupled neurons using internal state neuron information, according to an embodiment of the invention.

FIG. 4 shows a plot of the outputs of the neuromorphic circuit 300 with two coupled neurons using internal state neuron information, according to an embodiment of the invention. Note that the plot in the FIG. 4 corresponds to an embodiment with 400 inputs. In this plot, it can be seen that the first neuron will fire at times when there are not relatively correlated inputs, whereas the second neuron will fire only at the times when there are relatively correlated inputs. The ring events of the first neuron are driven not only by the arrival of the correlated inputs, but also by the accumulated effect of the noise input from the uncorrelated events. In contrast, the ring of the second neuron is driven almost exclusively by the events of the two correlated groups.

Figure 5:
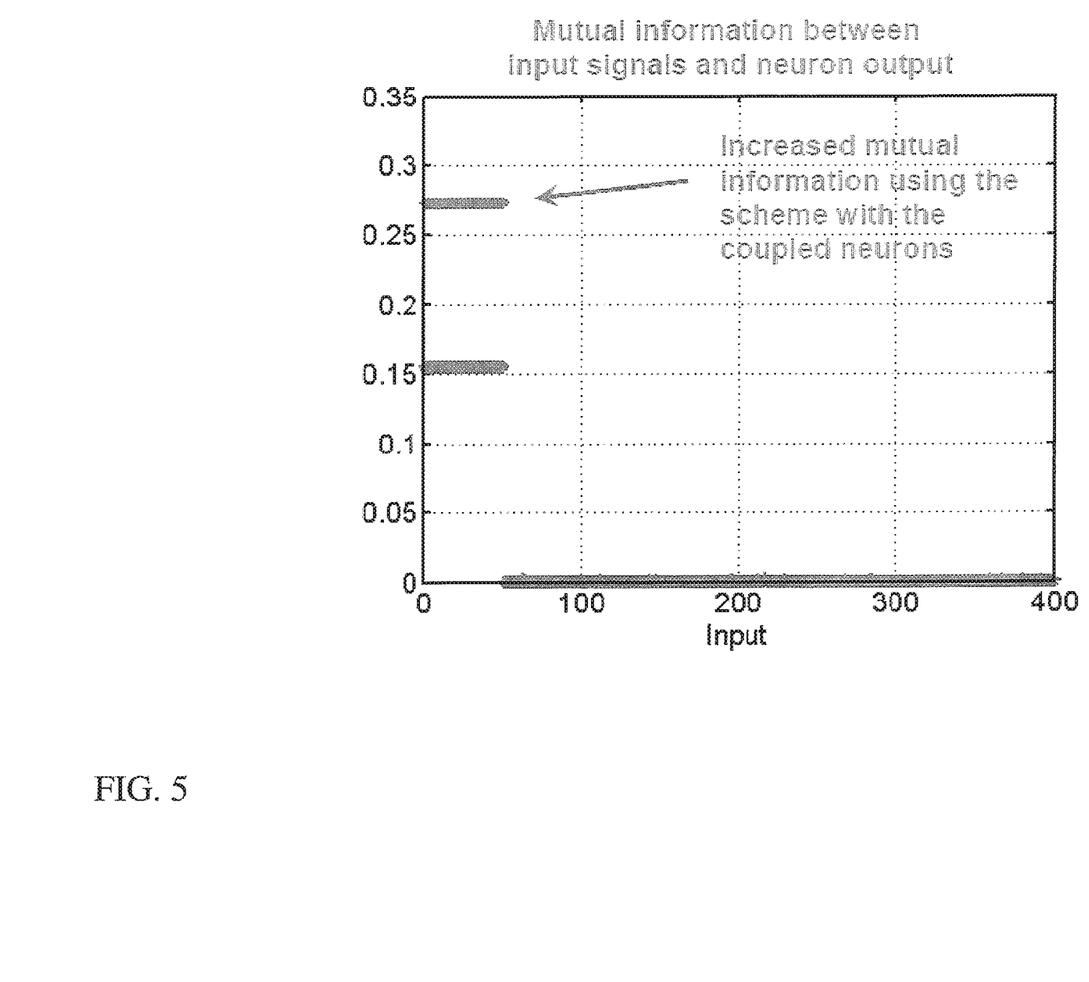
FIG. 5 shows a plot of the mutual information between inputs signals and neuron output of a neuro orphic circuit with two coupled neurons using internal state neuron information, according to an embodiment of the invention.

FIG. 5 shows a plot of the mutual information between inputs signals and neuron output of the neuromorphic circuit 300 with two coupled neurons using internal state neuron information, according to an embodiment of the invention. Note that the plot in the FIG. 5 also corresponds to an embodiment with 400 inputs. The mutual information gives the measure of the mutual dependence of the input signal and the neuron output. In this plot, the increased mutual information at the output of the second neuron can be seen where the internal state information is used.

Figure 6:
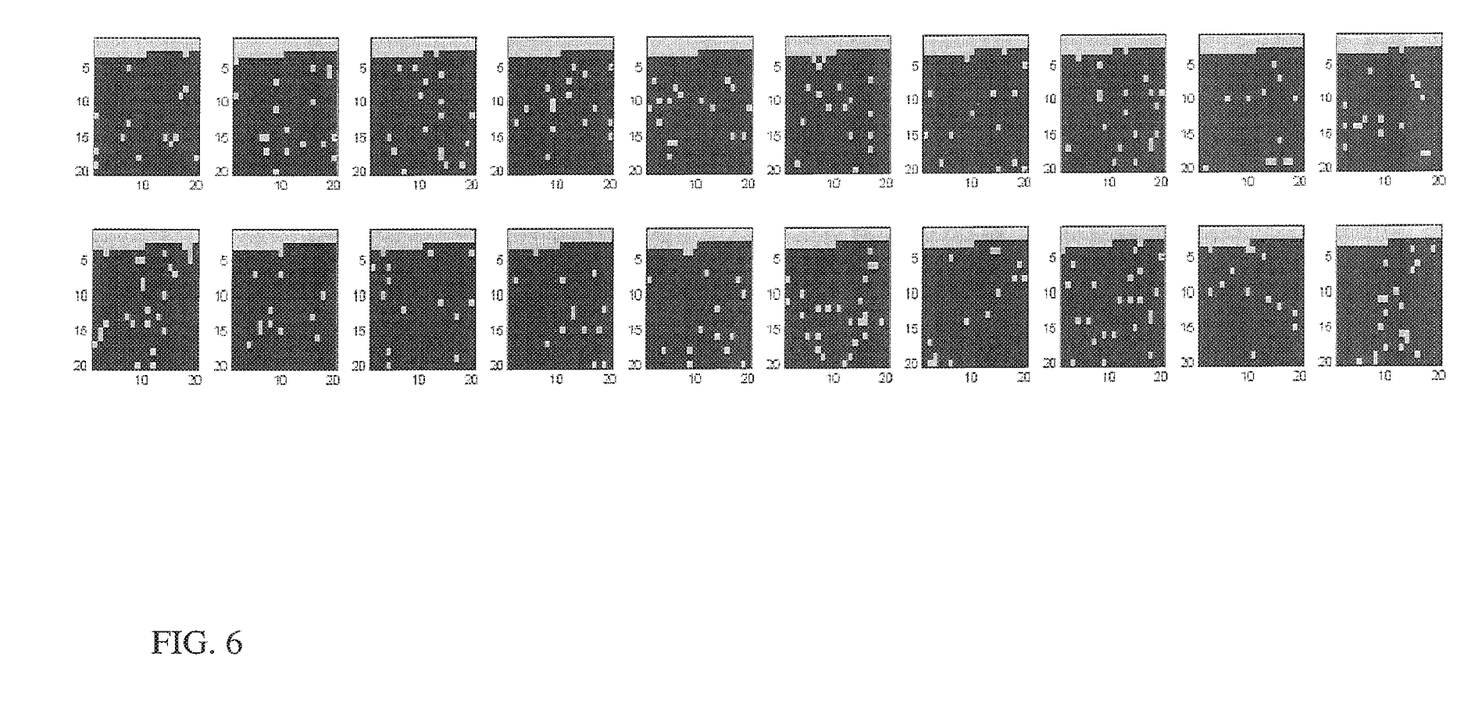
FIG. 6 shows the input signal at the second neuron firing time instances, according to an embodiment of the present invention.

FIG. 6 shows the input signal plotted in a two-dimensional plot at the second neuron firing time instances, according to an embodiment of the present invention. This figure also corresponds to an embodiment with 400 inputs. The second neuron only fires at the time instances of relatively correlated inputs.

Figure 7:
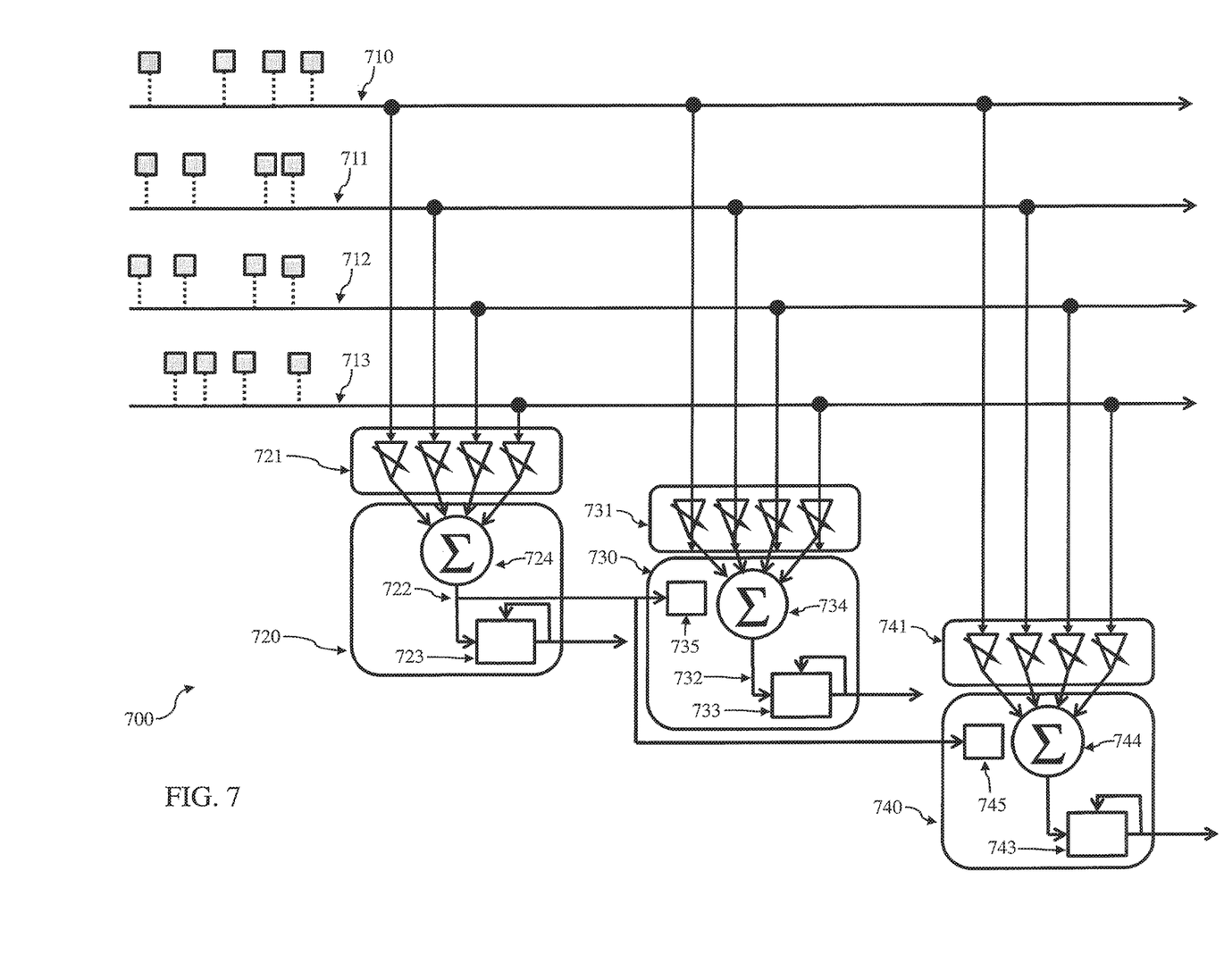
FIG. 7 illustrates a neuromorphic circuit with three coupled neurons using internal state neuron information, according to an embodiment of the invention.

FIG. 7 illustrates a neuromorphic circuit 700 with three coupled neurons using internal state neuron information, according to an embodiment of the invention. Four input lines 710, 711, 712, 713 are present, although in other embodiments more input lines may be present. These input lines 710, 711, 712, 713 connect to the synapses in the first set of synapses 721. The output of the first set of synapses 721 connects to the first neuron 720. Likewise, the output of the second set of synapses 731 connects to the second neuron 730, and the output of the third set of synapses 741 connects to the second neuron 740. The first neuron contains a summing element 724 that combines the output of the first set of synapses. The second and third neurons also contain a summing element. The output of the summing element of the first neuron 720 is a cumulative postsynaptic potential signal 722. The cumulative postsynaptic potential signal is then fed into the integrate and fire element 723. The cumulative postsynaptic potential signal 722 also connects to the second neuron, where it is an input to an enable element 735. The enable element 735 causes the second neuron to only become active if the cumulative postsynaptic potential signal is above a threshold value. Thus, the input and output of the integrate and fire element 733 of the second neuron will be disabled unless the cumulative postsynaptic potential signal 722 is above that threshold.

The three neuron configuration can be used in several ways. First, the system can be setup to determine the correlation strength of signals. Note that this architecture can be extended to more neurons beyond three for finer grain detection of correlation strength. For example, the threshold of the enable element of the second neuron can be set greater than the threshold of the enable element of the third neuron. In this case, for a strong correlation, both the second neuron and the third neuron will fire, but for a weak correlation, only the third neuron will fire.

Second, the system can be setup to detect different correlation strengths by using ranges of integration threshold intervals. For example, the second neuron can be set to have a threshold interval of $[a_2, b_2]$, where $a_2$ is the lower bound on the cumulative postsynaptic potential signal to enable the second neuron, and $b_2$ is the upper bound on the cumulative postsynaptic potential signal to enable the second neuron. Likewise, the third neuron can be set to have a threshold interval of $[a_3, b_3]$, where $a_3$ is the lower bound on the cumulative postsynaptic potential signal to enable the third neuron and $b_3$ is the upper bound on the cumulative postsynaptic potential signal to enable the third neuron. If the threshold values are set such that $a_2<b_2<a_3<b_3$, only the second neuron will fire for weak correlations, whereas only the third neuron will fire for strong correlations.

Figure 8A:
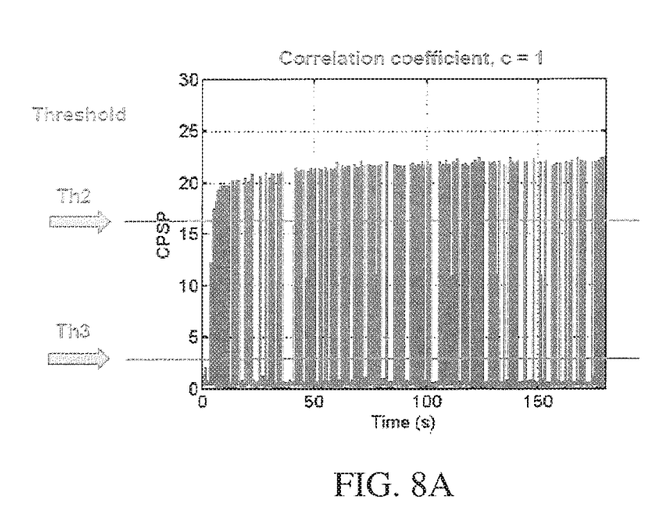
FIG. 8A shows the cumulative postsynaptic potential where the correlation coefficient c is 1.0, according to an embodiment of the present invention.
Figure 8B:
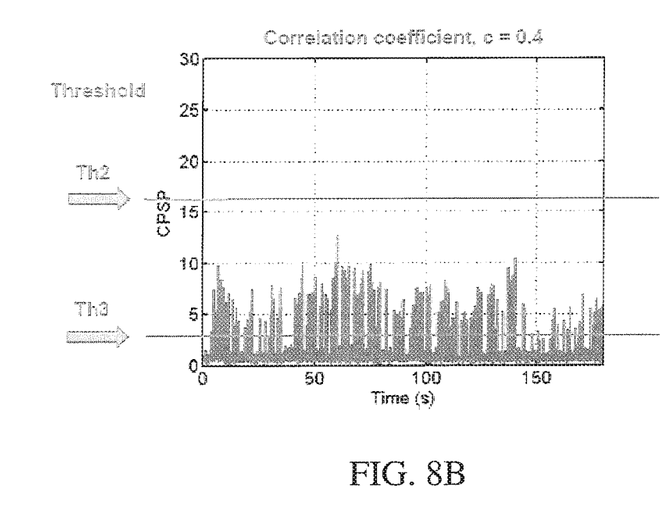
FIG. 8B shows the cumulative postsynaptic potential where the correlation coefficient c is 0.4, according to an embodiment of the present invention.

FIG. 8A shows the effect of varying thresholds, according to an embodiment of the present invention. In this case, the correlation coefficient c is 1.0. The values of the cumulative postsynaptic potential (CPSP) will frequently pass the both Threshold 2 and Threshold 3. FIG. 8B shows the situation where the correlation coefficient c is 0.4. Here, the CPSP will frequently pass Threshold 3, but does not pass Threshold 2.

Figure 9A:
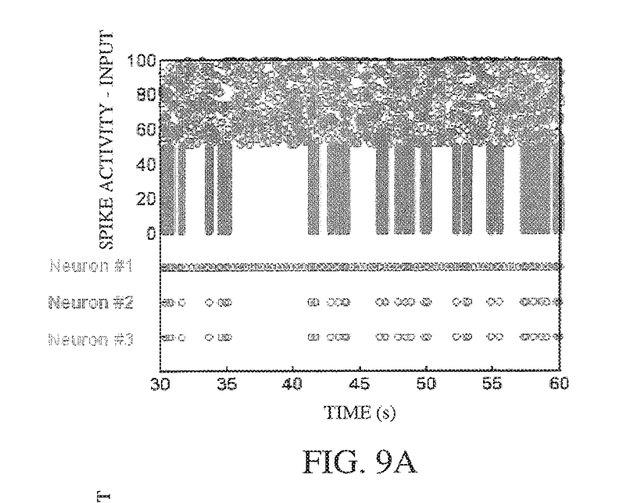
FIG. 9A shows the spike activity versus time for a correlation coefficient c of 1.0, according to an embodiment of the present invention.
Figure 9B:
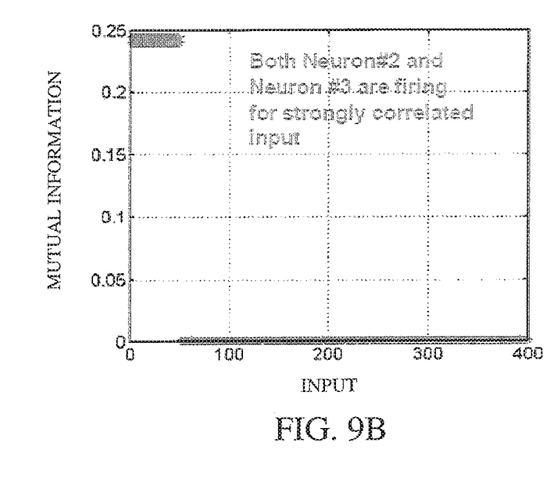
FIG. 9B shows the mutual information for a correlation coefficient c of 1.0, according to an embodiment of the present invention.
Figure 9C:
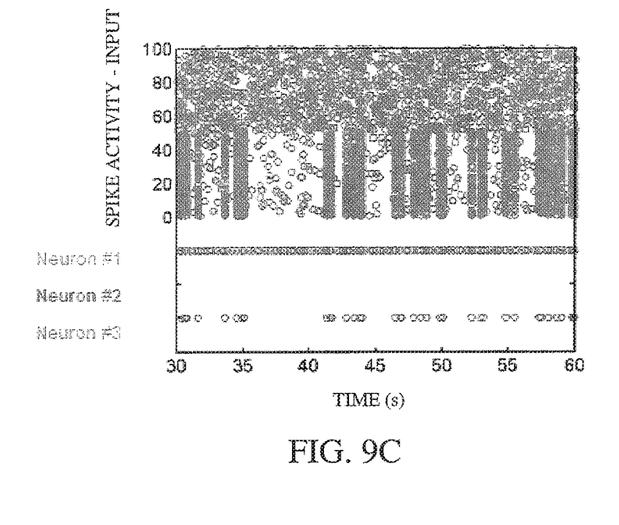
FIG. 9C shows the spike activity versus time for a correlation coefficient c of 0.6, according to an embodiment of the present invention.
Figure 9D:
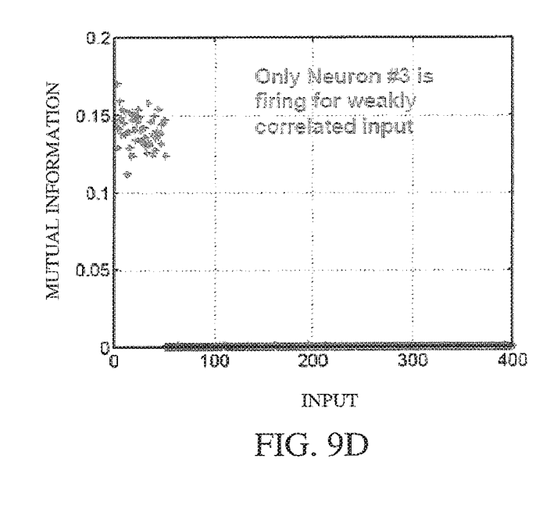
FIG. 9D shows the mutual information for a correlation coefficient c of 0.6, according to an embodiment of the present invention.

FIG. 9A shows the spike activity versus time for a correlation coefficient c of 1.0, according to an embodiment of the present invention. In this case, the first neuron will frequently fire. The second and third neuron show similar behavior. FIG. 9B shows the mutual information for this strong correlation case. FIG. 9C shows the spike activity versus time for a correlation coefficient c of 0.6, according to an embodiment of the present invention. In this case, the third neuron will fire, but the second neuron never fires due to the weaker correlation. FIG. 9D shows the mutual information for this weaker correlation case.

Figure 10A:
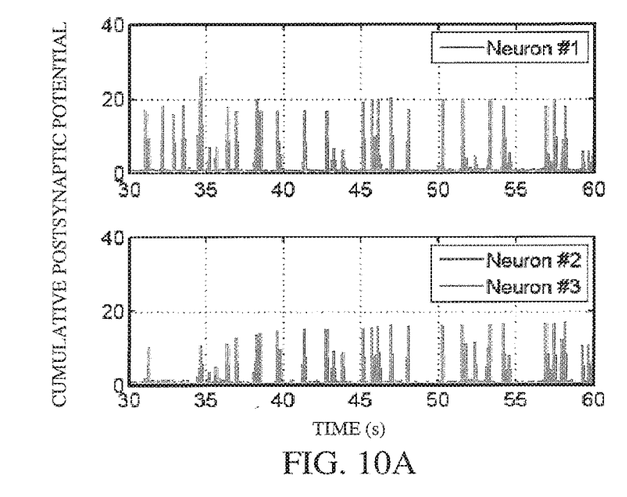
FIG. 10A shows the detection of multiple correlations, according to an embodiment of the present invention.
Figure 10B:
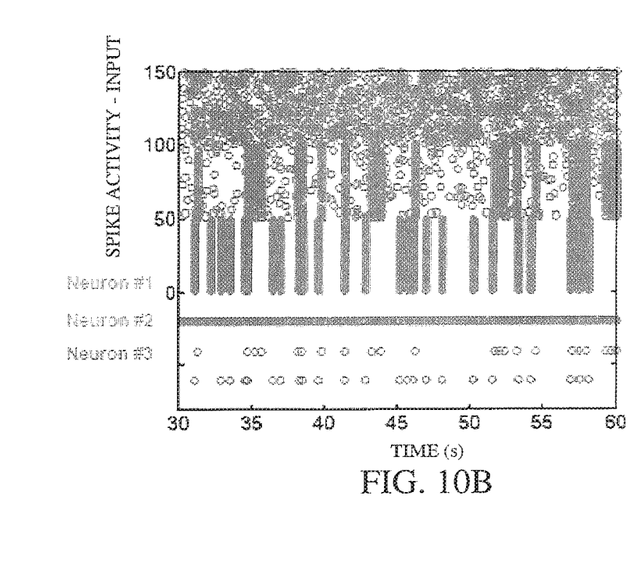
FIG. 10B shows the detection of multiple correlations where the second and third neuron fire at different times, according to an embodiment of the present invention.
Figure 10C:
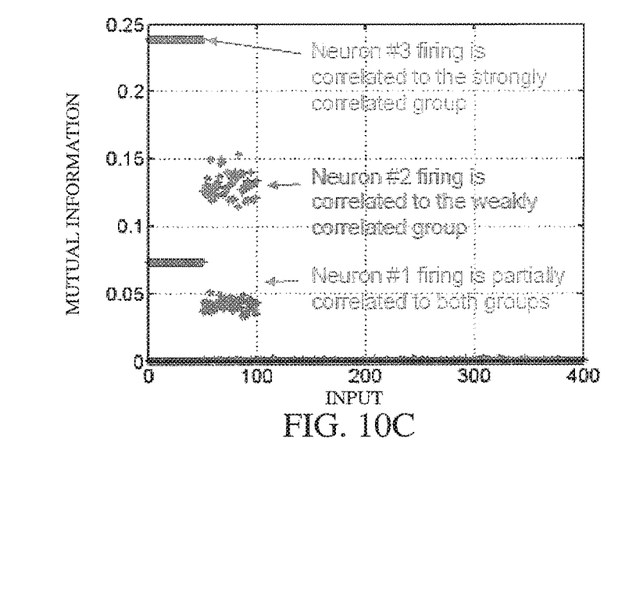
FIG. 10C shows the firing of the neurons corresponding to the groups that they are associated with, according to an embodiment of the present invention.

In an alternative configuration, the multiple neuron architecture can include multiple neurons with different ranges of integration threshold intervals. FIG. 10A shows the detection of multiple correlations, according to an embodiment of the present invention. The second neuron has a integration threshold set to $[a_2, b_2]$ and the third neuron has an integration threshold interval set to $[a_3, b_3]$. In this case, the values of $a_2$, $b_2$, $a_3$, and $b_3$ are set such that $a_2<b_2<a_3<b_3$. For these intervals, only the second neuron will fire for weak correlations. For strong correlations, only the third neuron will fire. In FIG. 10A, FIG. 10B, and FIG. 10C, input signals 1-50 are correlated with a correlation coefficient c of 1.0, input signals 51-100 are correlated with a correlation coefficient c of 0.6, and input signals 101-400 are uncorrelated. The neuromorphic architecture is capable of detecting correlated groups with different correlated coefficients. In FIG. 10A, the first neuron fires frequently, but the second and third neuron will fire at different times based on the correlated groups. The effect can be seen in FIG. 10B, where the second and third neuron fire at different times. FIG. 10C shows that the firing of the neurons corresponds to the groups that they are associated with. That is, the second neuron's firing is correlated with the strongly, c=1.0, correlated group, whereas the third neuron's firing is correlated with the weakly, c=0.6, correlated group.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

We claim:

1. An apparatus for computation, comprising:
a first electronic circuit simulating a first biological neuron comprising a first internal state, the first electronic circuit having a summing element for receiving a plurality of signals representing synapse outputs of a first set of synapses connected to said first electronic circuit, said summing element outputting a summation of the plurality of signals representing synapse outputs of the first set, the first internal state being a cumulative postsynaptic potential signal comprising the summation of signals output from said summing element; and
a second electronic circuit simulating a second biological neuron, the second electronic circuit having a summing element for receiving a plurality of signals representing synapse outputs of a second set of synapses connected to said second electronic circuit, said summing element outputting a summation of the plurality of signals representing synapse outputs of the second set, and
a link connecting an output of said summing element of said first electronic circuit to a threshold enable element of said second electronic circuit, wherein the cumulative postsynaptic potential signal is received at a threshold enable element input of the second electronic circuit via the link, said received cumulative postsynaptic potential signal modifying the operation of the second electronic circuit based on a result of comparing the cumulative postsynaptic potential signal to a threshold at the threshold enable element input of the second electronic circuit when simulating the second biological neuron.

2. The apparatus of claim 1, wherein the first internal state comprises a cumulative postsynaptic potential signal computed from fraction of inputs, spike timing information, and neuronal membrane.

3. The apparatus of claim 1, wherein the first electronic circuit simulating a first biological neuron comprises a phase-change device simulating an artificial phase-change-based neuron.

4. The apparatus of claim 1, wherein modifying the operation of the second electronic circuit comprises disabling an integration of the second electronic circuit.

5. The apparatus of claim 1, wherein the threshold enable element of the second electronic circuit comprises a threshold enable that disables the second electronic circuit when the first internal state is below a threshold value.

6. The apparatus of claim 1, wherein the threshold enable element of the second electronic circuit comprises a threshold enable that disables the second electronic circuit when the internal state input is outside a threshold range.

7. The apparatus of claim 1, wherein the plurality of synapse circuits is a first set of spike-timing dependent plasticity synapses, the first electronic circuit further comprises an integrate and fire element, and wherein the cumulative postsynaptic potential signal is input into the integrate and fire element and the output of the integrate and fire element is input to the first set of spike-timing dependent plasticity synapses.

8. An apparatus for computation, comprising:
a first electronic circuit simulating a first biological neuron comprising a first internal state, the first electronic circuit having a summing element for receiving a plurality of signals representing synapse outputs of a first set of synapses connected to said first electronic circuit, said summing element outputting a summation of the plurality of signals representing synapse outputs of the first set, the first internal state being a cumulative postsynaptic potential signal comprising the summation of signals output of a plurality of synapse circuits connected to said first electronic circuit;
a second electronic circuit simulating a second biological neuron, the second electronic circuit having a summing element for receiving a plurality of signals representing synapse outputs of a second set of synapses connected to said second electronic circuit, said summing element outputting a summation of the plurality of signals representing synapse outputs of the second set, and
a first link connecting an output of said summing element of said first electronic circuit to a threshold enable element of said second electronic circuit, wherein the cumulative postsynaptic potential signal is received at a threshold enable element input of the second electronic circuit via the first link, said received cumulative postsynaptic potential signal received at the second electronic circuit modifying the operation of the second electronic circuit based on a result of comparing the cumulative postsynaptic potential signal to a threshold at the threshold enable element at the second electronic circuit; and
a third electronic circuit simulating a third biological neuron, and
a second link connecting said output of said summing element of said first electronic circuit to a threshold enable element of said third electronic circuit, the third electronic circuit having a summing element for receiving a plurality of signals representing synapse outputs of a third set of synapses connected to said third electronic circuit, said summing element outputting a summation of the plurality of signals representing synapse outputs, wherein the cumulative postsynaptic potential signal is received at a threshold enable element input of the third electronic circuit via the second link, said cumulative postsynaptic potential signal received at the third electronic circuit modifying the operation of the third electronic circuit based on a result of comparing the cumulative postsynaptic potential signal to a threshold at the threshold enable element at the third electronic circuit.

9. The apparatus of claim 8, wherein:
the threshold enable element of the second electronic circuit comprises a first threshold enable that disables the second electronic circuit when the received cumulative postsynaptic potential signal input at the second electronic circuit is below a first threshold value; and
the threshold enable element of the third electronic circuit comprises a second threshold enable that disables the third electronic circuit when the received cumulative postsynaptic potential signal input at the third electronic circuit is below a second threshold value.

10. The apparatus of claim 9, wherein the first threshold value is less than the second threshold value.

11. The apparatus of claim 8, wherein modifying the operation of the second electronic circuit comprises disabling an integration of the second electronic circuit, and wherein modifying the operation of the third electronic circuit comprises disabling an integration of the third electronic circuit.

12. The apparatus of claim 8, wherein:
the threshold enable element of the second electronic circuit comprises a threshold enable that disables the second electronic circuit when the received cumulative postsynaptic potential signal input at the second electronic circuit is outside a first threshold range; and the threshold enable element of the third electronic circuit comprises a threshold enable that disables the second electronic circuit when the received cumulative postsynaptic potential signal input at the third electronic circuit is outside a second threshold range.

13. The apparatus of claim 12, wherein the upper bound of the first threshold range is less than the lower bound of the second threshold range.

14. The apparatus of claim 8, wherein the first internal state comprises a cumulative postsynaptic potential signal computed from fraction of inputs, spike timing information, and neuronal membrane.

15. The apparatus of claim 8, wherein the plurality of synapse circuits is a first set of spike-timing dependent plasticity synapses, the first electronic circuit further comprises an integrate and fire element, wherein the cumulative postsynaptic potential signal is input into the integrate and fire element and the output of the integrate and fire element is input to the first set of spike-timing dependent plasticity synapses.

16. The apparatus of claim 8, wherein the first electronic circuit comprises an artificial phase-change-based circuit.

17. A method for computation, the method comprising:
receiving a first set of inputs at a first spike-timing dependent plasticity synapse of a first set of synapses;
receiving a second set of inputs at a second spike-timing dependent plasticity synapse of the first set of synapses;
combining, at a summing element of a first electronic circuit, the output of the first spike-timing dependent plasticity synapse and the second spike-timing dependent plasticity synapse in the first electronic circuit simulating a first biological neuron to generate a cumulative postsynaptic potential signal, said cumulative postsynaptic potential signal comprising a summation of signals output of said summing element; and receiving the cumulative postsynaptic potential signal over a link connecting an output of said summing element to an input of a threshold enable element of a second electronic circuit simulating a second biological neuron, the second electronic circuit having a summing element for receiving and combining an output of a first spike-timing dependent plasticity synapse of a second set of synapses and an output of a second spike-timing dependent plasticity synapse of the second set of synapses and the cumulative postsynaptic potential signal modifying the operation of the second electronic circuit based on a result of comparing the cumulative postsynaptic potential signal to a threshold at the threshold enable element.

18. The method of claim 17, wherein modifying the operation of the second electronic circuit based on the cumulative postsynaptic potential signal comprises modifying the operation of the second electronic circuit when the cumulative postsynaptic potential signal is below a threshold.

19. The method of claim 17, wherein modifying the operation of the second electronic circuit comprises disabling an integration of the second electronic circuit.

20. The method of claim 17, wherein modifying the operation of the second electronic circuit based on the cumulative postsynaptic potential signal comprises disabling the operation of the second neuron when the cumulative postsynaptic potential signal is outside a threshold range.

* * * * *